(12) United States Patent
Lee

(10) Patent No.: US 7,358,692 B2
(45) Date of Patent: Apr. 15, 2008

(54) ALIGNMENT METHOD

(75) Inventor: Dongho Lee, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 403 days.

(21) Appl. No.: 11/146,555

(22) Filed: Jun. 6, 2005

(65) Prior Publication Data

US 2006/0273750 A1    Dec. 7, 2006

(51) Int. Cl.
*H02P 1/18* (2006.01)

(52) U.S. Cl. .................. 318/254; 318/138; 318/439; 318/432

(58) Field of Classification Search ............ 318/254, 318/439, 138, 432, 434
See application file for complete search history.

(56) References Cited

U.S. PATENT DOCUMENTS

| | | | |
|---|---|---|---|
| 3,854,080 A | 12/1974 | Bambara et al. | |
| 4,697,129 A | 9/1987 | Enami | |
| 5,221,881 A * | 6/1993 | Cameron | 318/254 |
| 5,343,127 A * | 8/1994 | Maiocchi | 318/254 |
| 5,350,984 A | 9/1994 | Carobolante | |
| 5,525,886 A * | 6/1996 | Lyons et al. | 318/701 |
| 5,572,097 A | 11/1996 | Cameron | |
| 5,623,379 A | 4/1997 | Nishimura | |
| 6,441,572 B2 * | 8/2002 | Batzel | 318/254 |
| 6,653,811 B2 | 11/2003 | Branecky | |

* cited by examiner

*Primary Examiner*—Rina Duda

(57) ABSTRACT

An apparatus includes a motor including a rotor and a coil system comprising a first set of coils, a second set of coils, and a third set of coils; and a switching mechanism that connects the first set of coils and the second set of coils to a first polarity output of a power source and connects the third set of coils to a second polarity output of the power source, wherein the switching mechanism applies energy from the power source to the coil system to move the rotor to a desirable start-up position wherein a magnetic flux generated by the rotor is positionally end directionally aligned with a magnetic flux generated by the coil system.

22 Claims, 2 Drawing Sheets

ALIGNMENT METHOD

BACKGROUND

Motors, such as sensorless brushless direct current motors (BLDC), may start-up in a number of positions. Attempting start-up from some positions uses a higher current than attempting start-up from other positions. The higher current may contribute to inefficiencies in motor operation or may cause damage to the motor.

DETAILED DESCRIPTION OF THE DRAWINGS

Figure 1:
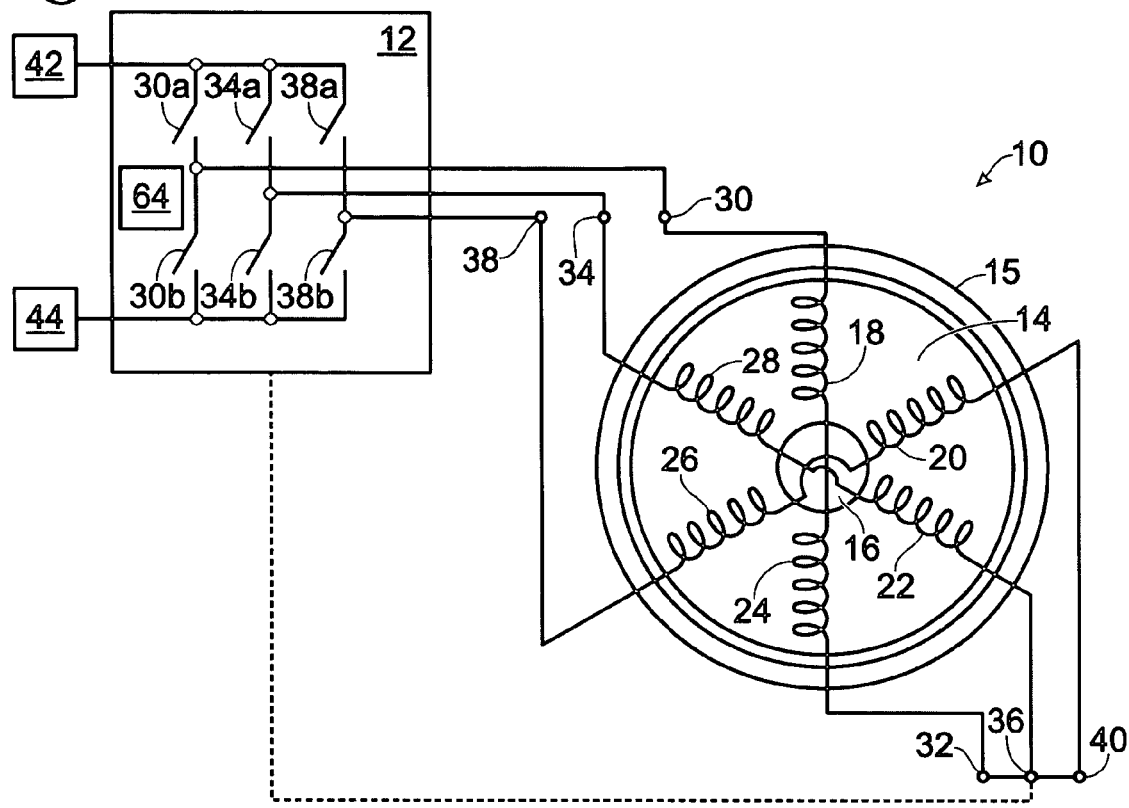
FIG. 1 is a schematic view of one embodiment of a motor including a power supply and a coil system.

FIG. 1 is a schematic view of one embodiment of a motor 10 including an embodiment of a switching mechanism, such as sensorless BLDC motor drive system 12. A sensorless drive system may start its driving sequence from a fixed position. Generally, when the rotor is in a desirable position for start-up, a first magnetic flux of a permanent magnet of the motor and a second magnetic flux of coils connected to terminals of the motor are substantially aligned with one another and extend in the same direction. When the first and second magnetic fluxes are not aligned, the motor might be started but may experience more failures than a start-up when the motor is in a desirable position for start-up. Therefore, the rotor may desirably be aligned to a desirable position for start-up before it is started.

The alignment can be accomplished by energizing a set of coils for a period of time. By doing this, the rotor will move and finally settle down to a desirable position due to the interaction of the two magnetic forces. However, when the first and second fluxes are substantially aligned with one another but extend in opposite directions, the forces of the magnetic fluxes may substantially cancel each other and the rotor will not move, i.e., the motor will fail to start. Such a position may be termed an undesirable position for start-up.

Drive system 12 may include a first set of switches 30a, 34a, 38a and a second set of switches 30b, 34b and 38b, each connected to terminals 30, 34 and 38, respectively. Motor 10 may further include a positive side, or polarity, 42 for connection to a positive side of a power source and that is connected to first set of switches 30a, 34a, and 38a, and a negative side, or polarity, 44 for connection to a negative side of a power source and that is connected to second set of switches 30b, 24b and 38b. Drive system 12 may further include a control device 64, such as a micro controller, a micro processor, a pre-programmed sequencer, an ASIC (Application-Specific Integrated Circuit) device, or the like, which may control the connection of each of switches 30a to 38b to one of corresponding side 42 or 44 of drive system 12. In one embodiment control device 64 includes memory to store processor executable instructions that when executed control the application of power to coil system 14 by controlling the states of switches 30a-38b so that the rotor will be aligned to the desirable position for startup. During a typical operational sequence the connection of terminals 30, 34 and 38 to the positive or negative side of the drive system 12 will be changed but, at any given moment of time, typically one of terminals 30, 34 and 38 will be connected to positive side 42 and another of terminals 30, 34 and 38 will be connected to negative side 44 of drive system 12. Each of the switches 30a-38b of drive system 12 may be defined as any suitable kind of device or method that allows electrons to flow to the respective terminal. In an example embodiment, switches 30a-38b may be a transistor, such as a BJT (bipolar junction transistor), an IGBT (insulated gate bipolar transistor) or a MOSFET (metal oxide semiconductor field effect transistor). In this normal operational connection condition of the motor, the current flow though the coil set connected to the negative side of drive system 12 will be the same amount of current flowing through the positive side of drive system 12, thereby generating a symmetrical magnetic flux distribution within the motor. In this normal operation condition, the flux generated by the two coil sets will extend through the pole of the one positively connected coil set and then will extend back through the pole of the one negatively connected coil set.

Drive system 12 may further include a stator or coil system 14, a motor case 15, and a rotor 16 which may be referred to as the permanent magnet of the motor. Motor 10 may be a multi-phase brushless direct current (dc) motor and, in particular, may be a brushless three phase dc motor. Motor 10 may be used, for example, for rotating data media in computer related applications, such as hard disk drives, CD ROM drives, floppy disks, and the like. In the embodiment shown, coil system 14 may include six coils 18, 20, 22, 24, 26 and 28. Coils 18 and 24 may be positioned 180 degrees from one another within coil system 14, and may be connected to one another and to terminals 30 and 32. Coils 20 and 26 may be positioned 180 degrees from one another within coil system 14, and may be connected to one another and to terminals 34 and 36. Coils 24 and 28 may be positioned 180 degrees from one another within coil system 14, and may be connected to one another and to terminals 38 and 40. Of course, other sizes, numbers, arrangements, and types coils may be utilized in motor 10.

Terminals 30, 34 and 38 may each be connected to either side, schematically represented by reference numbers 42 for the positive side and 44 for the negative side of drive system 12, of the BLDC motor drive system 12, depending on the desired operation for a given time. Terminals 32, 36 and 40 may be tied together and may or may not be connected to drive system 12 depending on the drive system topology. Accordingly, the connection of terminals 32, 36 and 40 to drive system 12 is shown in dash lines. Each of the terminals 30-38 may be connected to a switch 30a-38b, respectively, within drive system 12. In the embodiment shown, terminals 30, 34 and 38 are connected to the first and second set of switches and terminals 32, 36 and 40 are unconnected. As stated above, each of terminals 32, 36 and 40 may also be connected to a switch within drive system 12.

In operation of the motor after start-up, the coils, or coil sets as in the embodiment shown, may be energized in sequences wherein a current path is established through two coil sets with the third coil set un-energized or "floating." The sequences are arranged such that as the current paths are changed, one of the coil sets of the current path is switched to float, and the previously floating coil set is switched into the current path. The sequence may be defined such that when the floating coil set is switched into the current path, the direction of current flow will be into a terminal connected to the floating coil set switched into the current path that corresponds to the terminal into which current flowed for the coil set which was included in the prior current path. For example, if current flows into terminal 34 to then flow through coil set 28 and 22, with coil set 18 and 24 as the floating coil set, when coil set 18 and 24 is switched into the current path, current would be directed to flow into terminal 30 to then flow through coil set 18 and 24. In this manner, six energy sequences may be defined for each electrical cycle in a three phase motor. Upon shut down of motor 10, in the embodiment shown, rotor 16 may come to rest substantially in one of six positions, as will be described below.

FIGS. 2-7 show rotor 16 in six different stop or rest positions around coil system 14, wherein coil system 14 is shown having the same energized configuration in each of the six figures. In particular, in each of FIGS. 2-7, terminal 30 (which is coupled to coils 18 and 24) is connected to positive side 42 of drive system 12 and, terminal 38 (which is coupled to coils 20 and 26) is connected to negative side 44 of drive system 12. Coils 22 and 28 are un-energized, or floating.

Figure 2:
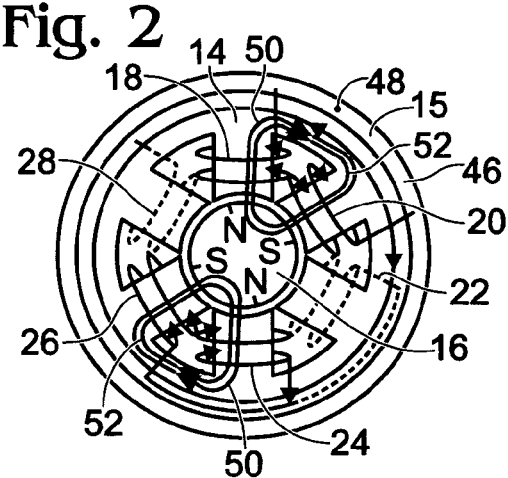
FIGS. 2-7 show one embodiment of a coil system of a motor with a rotor in six different positions.

FIG. 2 shows rotor 16 in a first position 46, which corresponds to a desirable start-up position for the rotor. During start up, drive system 12 applies energy to the coil system 14, to accomplish start-up of the motor, assuming that the rotor 16 is positioned as shown in FIG. 2. If the rotor 16 is not in this position when the motor start-up process begins, motor 10 may not operate properly. (An indication mark 48 is shown on motor case 15 to illustrate the rotational position of rotor 16 in each of FIGS. 2-7). In this desirable start-up position 46, a magnetic flux 50 generated by rotor 16 may be positionally and directionally aligned with a magnetic flux 52 generated by coil system 14. Flux 50 and 52 both extend in a clockwise direction. The positional and directional alignment of magnetic flux 50 and magnet flux 52 will result in a complementary magnetic force that will operate to move rotor 16 upon start-up with a relatively small amount of energy from drive system 12. In the embodiment shown, position 46 of rotor 16 may be referred to as a 30 degree position, i.e., rotor 16 is positioned rotated from a zero degree position by 30 degrees in a clockwise direction. In first position 46, there is substantially no net torque on the rotor.

Figure 3:
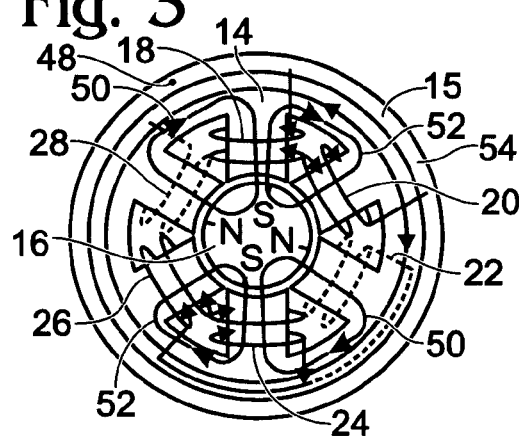

FIG. 3 shows rotor 16 in a second position 54. In this position 54, magnetic flux 50 generated by rotor 16 is not positionally aligned with magnetic flux 52 generated by coil system 14. Flux 50 and 52 both extend in a clockwise direction. The positional offset between magnetic flux 50 and magnet flux 52 will result in a non-canceling magnetic force that will operate to move rotor 16 clockwise toward the desirable startup position 46 (see FIG. 2). The nominal amount of energy utilized to start rotor 16 from position 54 may be more than the energy utilized to start rotor 16 from the desirable start-up position 46, shown in FIG. 2. In the embodiment shown, position 54 of rotor 16 may be referred to as a −30 degrees position.

Figure 4:
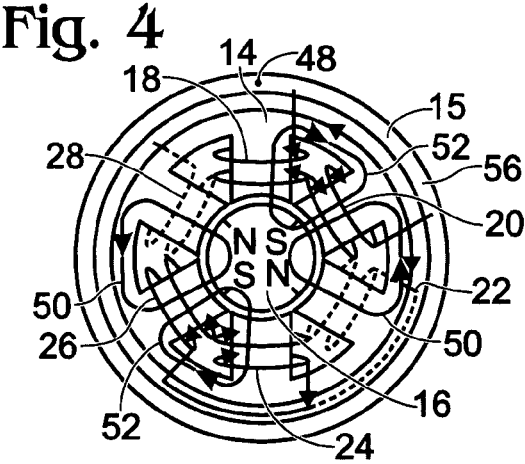

FIG. 4 shows rotor 16 in a third position 56. In this position 56, magnetic flux 50 generated by rotor 16 is not positionally aligned with magnetic flux 52 generated by coil system 14. Flux 50 extends in a counter-clockwise direction and flux 52 extends clockwise direction. The positional offset between magnetic flux 50 and magnet flux 52 will result in a non-canceling magnetic force that will operate to move rotor 16 clockwise toward the desirable startup position 46. In the embodiment shown, position 56 of rotor 16 may be referred to as a zero degree position.

Figure 5:
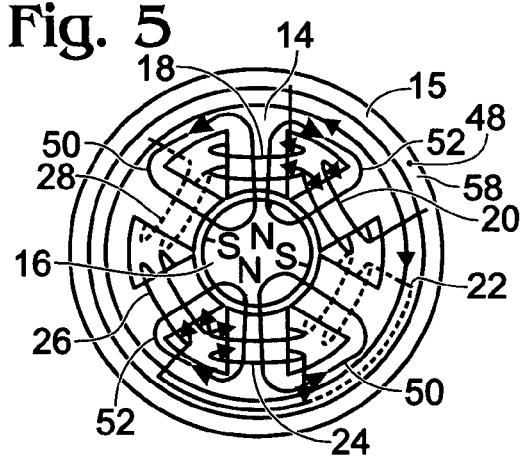

FIG. 5 shows rotor 16 in a fourth position 58. In this position 58, magnetic flux 50 generated by rotor 16 is not positionally aligned with magnetic flux 52 generated by coil system 14. Flux 50 extends in a counter clockwise direction and flux 52 extends in a clockwise direction. The positional offset between magnetic flux 50 and magnet flux 52 will result in a non-canceling magnetic force that will operate to move rotor 16 counterclockwise toward the desirable startup position 46 (see FIG. 2). In the embodiment shown, position 58 of rotor 16 may be referred to as a 60 degree position.

Figure 6:
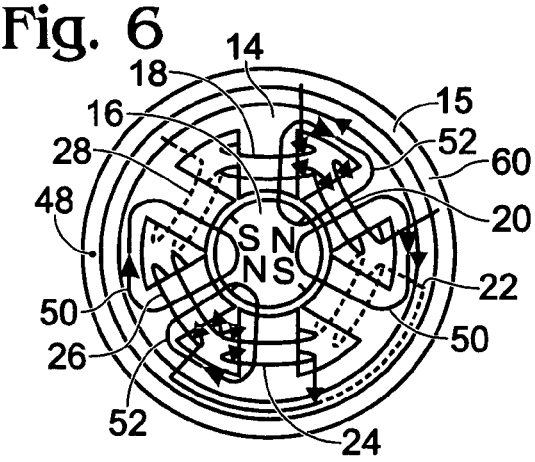

FIG. 6 shows rotor 16 in a fifth position 60. In this position 60, magnetic flux 50 generated by rotor 16 is not positionally aligned with magnetic flux 52 generated by coil system 14. Flux 50 and 52 both extend in a clockwise direction. The positional offset between magnetic flux 50 and magnet flux 52 will result in a non-canceling magnetic force that will operate to move rotor 16 counterclockwise toward the desirable startup position 46. In the embodiment shown, position 60 of rotor 16 may be referred to as a −90 degrees position.

Figure 7:
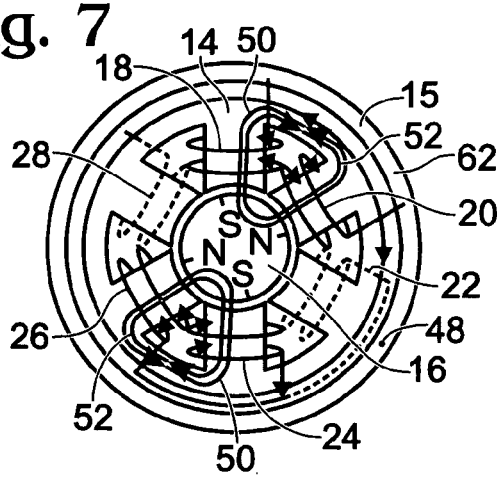

FIG. 7 shows rotor 16 in a sixth position 62, which corresponds to an undesirable start-up position, an opposite balanced position, or a non-rotational start-up position for the rotor. In this undesirable start-up position 62, magnetic flux 50 generated by rotor 16 may be positionally aligned with but directionally opposed to magnetic flux 52 generated by coil system 14. Flux 50 extends in a counter clockwise direction and flux 52 extends in a clockwise direction. The positional alignment and directional opposition of magnetic flux 50 and magnetic flux 52 may result in canceling or substantially canceling magnetic forces that may inhibit movement of rotor 16 upon start-up, without input of a relatively large amount of energy to make use of any slight mechanical unbalance. In the embodiment shown, the undesirable start-up position 62 of rotor 16 may be referred to as a 120 degree position. In position 62 shown in FIG. 7, there is substantially no net torque on the rotor.

Rotor 16 generally will position itself within one of six positions 46 and 54-62 upon shutdown of the motor. Accordingly, for the single energized configuration of coil system 14 shown in FIGS. 2-7, there is a one in six chance that rotor 16 will be in the undesirable start-up position 62, shown in FIG. 7. Similarly, in each of the remaining five possible energy configurations of coil system 14 (not shown), i.e., in each of the remaining five possible positions of magnetic flux 52, there is a one in six chance that rotor 16 will be in an undesirable start-up position 62 upon shutdown.

In one embodiment of a start-up routine, rotor 16 will be positioned in the desirable start-up position 46 (see FIG. 2). Positioning of rotor 16 into the desirable start-up position 46 may be facilitated by a short period of energization, i.e., an alignment energization, wherein for example, coils 18/24 and 20/26 are energized. This will move rotor 16 into the desirable start-up position 46, ready for start-up operation of the motor. However, this alignment energization may function to move rotor 16 into the desirable start-up position 46 if rotor 16 has stopped in a position so that it can be moved, but not if rotor 16 has stopped at the undesirable start-up position 62 (see FIG. 7).

Figure 8:
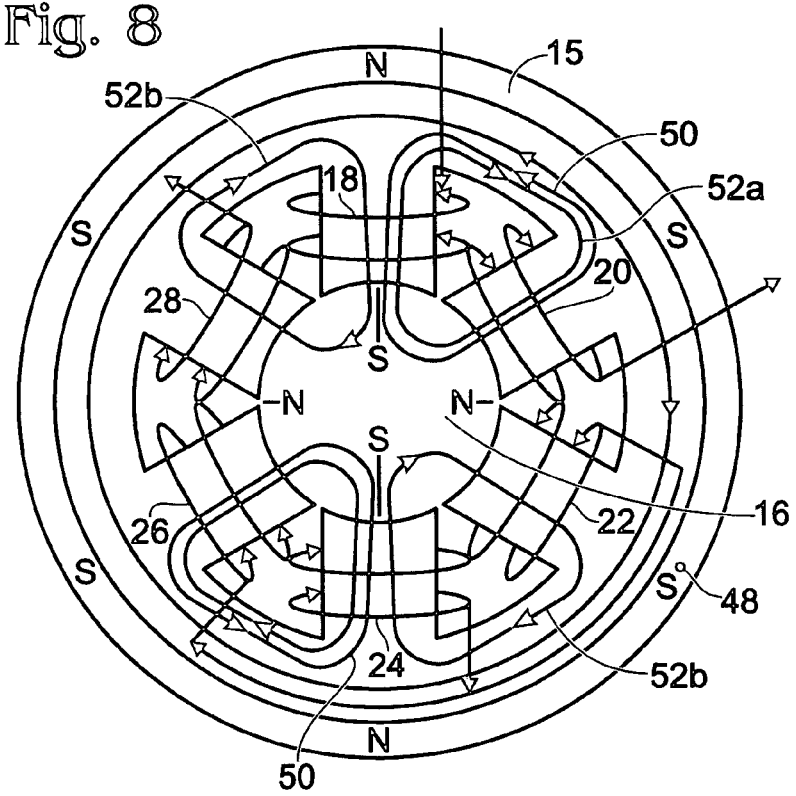
FIG. 8 shows one embodiment of a coil system of a motor in a pre-alignment or unsymmetrical energization step.

Referring to FIG. 8, prior to such an alignment energizing process, i.e., moving rotor 16 to the desirable start-up position 46 (see FIG. 2), coil system 14 may be energized in an unsymmetrical or pre-alignment energizing step which will result in movement of rotor 16, even if rotor 16 is stopped in the undesirable start-up position 62 (see FIG. 7). The unsymmetrical energizing step may include connecting two of the three terminals 30, 34 and 38 (and thereby causing energy to be supplied to the corresponding coil sets coupled to the terminals) to one side of power supply 12, such as connecting terminals 30 and 34 to positive voltage side 42, and connecting a third terminal to the other side of the drive system 12, such as connecting terminal 38 to negative voltage side 44 of drive system 12. Accordingly, the unsymmetrical energizing step may be defined as energizing the coils of coil system 14 such that an unsymmetrical magnetic flux is created within coil system 14. The unsymmetrical energizing step may also be defined as energizing the coils of coil system 14 with an unsymmetrical current flow through the coils of coil system 14. In one particular example, two coil sets (such as terminals 30 and 34) may be connected to positive side 42 and the remaining coil set (terminal 38) may be connected to the negative side 44 of drive system 12, such that the current flowing through the negative side coil set may be twice the amount of current flowing through the positive side coil set. This unsymmetrical current flow through coil system 14 may produce an unsymmetrical magnetic flux within coil system 14. In this example unsymmetrical energization condition, the flux generated by the three coil sets will extend through the pole of the one negatively connected coil set, for example, and then will extend back between the poles of the two positively connected coil sets, instead of down through a single pole itself as in a normal operational condition.

In this manner, magnetic flux 52 of coil system 14 may be thought of as having two components 52a and 52b. Accordingly, the resulting magnitude of the magnetic flux 52, comprised of fluxes 52a and 52b in the arm of the stator that is through coil 18 will be less than the resulting magnitude of the magnetic flux 52 in the arm of the stator that is through coil 20, thereby causing a net torque on rotor 16 that will rotate it toward desirable start-up position 46. The torque exerted on rotor 16 by magnetic flux 52 from the arm of the stator through coil 20, therefore, will not cancel, or substantially will not cancel, the torque exerted on rotor 16 by magnetic flux 52 from the arm of the stator through coil 18, and will not result in non-rotation of rotor 16 in this position. The current supplied by drive system 12 to the coil sets during the pre-alignment or unsymmetrical energizing process of the disclosed example embodiment may be approximately thirty percent (30%) or less of the current supplied to the coil sets during normal operation of motor 10.

As the unsymmetrical or pre-alignment energizing step is completed, and as rotor 16 is still moving, the flow of current to or from one of the terminals connected to one side of power supply 12, may be interrupted such that two of the coil sets are energized and one of the coil sets is not energized. For example, the current supplied to terminal 34 may be interrupted with terminal 30 remaining connected to positive voltage side 42 and terminal 38 remaining connected to negative voltage side 44 of drive system 12. This sequence may be utilized to position rotor 16 in the desirable start-up position 46 (see FIG. 2). The motor may then be stopped, leaving rotor 16 in the desirable start-up position 46, or the motor may then move into an operational mode with rotor 16 beginning operation in desirable start-up position 46.

The unsymmetrical pre-alignment energization step may result in movement of rotor 16 out of the undesirable start-up position 62, or out of any of positions 46 and 54-62, without utilizing large amounts of energy. In particular, the energy utilized during the unsymmetrical energizing step may be less than or equal to the energy utilized during the normal alignment routine wherein two coil sets are energized to move rotor 16 into desirable start-up position 46. Moreover, the energy utilized during the unsymmetrical energization step may be less than or equal to the energy utilized by the system during normal operation. An energy input equal or less than a nominal energy may be sufficient to move rotor 16 because the magnetic fluxes created are unsymmetrical. This reduced energy consumption may reduce damage to the motor, may reduce the energy usage of the motor, and should result in movement of rotor 16 during the pre-alignment steps, even if rotor 16 is initially positioned in undesirable start-up position 62 (see FIG. 7). Moreover, due to the non-canceling magnetic fluxes 50, 52a and 52b, the rotor will be moved, and will not remain in an undesirable start-up position 62.

In conclusion, while the disclosed subject matter has been particularly shown and described with reference to the foregoing embodiments, those skilled in the art will understand that many variations may be made therein without departing from the spirit and scope of the present disclosure as defined in the following claims. This description of the embodiments should be understood to include some of the novel and non-obvious combinations of elements described herein, and claims may be presented in this or a later application to other novel and non-obvious combinations of these elements. The foregoing embodiments are illustrative, and no single feature or element forms a part of all possible combinations that may be claimed in this or a later application. Where the claims recite "a" or "a first" element or the equivalent thereof, such claims should be understood to include incorporation of one or more such elements, possibly including and possibly not including two or more such elements.

I claim:

1. An apparatus comprising:
   a motor including a rotor and a coil system comprising a first set of coils, a second set of coils, and a third set of coils; and
   a switching mechanism that connects the first set of coils and the second set of coils to a first polarity output of a power source and connects the third set of coils to a second polarity output of the power sources,
   wherein the switching mechanism applies energy from the power source to the coil system to move the rotor to a desirable start up position wherein a magnetic flux generated by the rotor is positionally and directionally aligned with a magnetic flux generated by the coil system.

2. The apparatus of claim 1 wherein said first polarity output is positive and said second polarity output is negative.

3. The apparatus of claim 1 wherein said desirable start-un position comprises a 30 degree position of said rotor.

4. The apparatus of claim 1 wherein the switching mechanism includes a configuration to cause a first current to be supplied to said first set of coils and said second set of coils and cause a second current to be supplied to said third set of coils, wherein said second current is equal in magnitude but opposite in direction to said first current.

5. The apparatus of claim 4 wherein said first current is evenly split between each coil of said first set of coils and said second set of coils, and wherein said second current is evenly split between each coil of said third set of coils, such that a current through each coil of said first set of coils and said second set of coils is different in magnitude than a current through each coil of said third set of coils.

6. The apparatus of claim 1 wherein said switching mechanism includes a switch array including a plurality of switches adapted for removably connecting each of said first set of coils, said second set of coils, and said third set of coils to said first polarity output and to said second polarity output.

7. The apparatus of claim 1 wherein said first set of coils, said second set of coils, and said third set of coils each comprise two coils positioned 180 degrees from one another.

8. The apparatus of claim 1 wherein said switching mechanism includes a configuration to cause a current to flow through each coil of said first set of coils and said second set of coils which is half of a current that flows through each coil of said third set of coils.

9. The apparatus of claim 1 wherein said first set of coils, said second set of coils, and said third set of coils together comprise a number of coils chosen from one of three coils, six coils, twelve coils, and eighteen coils.

10. The apparatus of claim 1 wherein said power source comprises a direct current power source.

11. The apparatus of claim 1 wherein said motor comprises a brushless direct current motor.

12. The apparatus of claim 1 wherein said switching mechanism applies energy from said power source to said coil system to produce an unsymmetrical magnetic flux within said coil system and move said rotor to said desirable start-up position wherein an amount of current through said third set of coils is twice an amount of current through said first set of coils and said second set of coils.

13. The apparatus of claim 12 wherein after said unsymmetrical magnetic flux is produced within said coil system, said switching mechanism interrupts current to one of said first set of coils and said second set of coils.

14. A method of aligning a brushless direct current motor, comprising:
coupling a first coil set and a second coil set of the motor to a first polarity connection of a power source; coupling a third coil set of the motor to a second polarity connection of the power source; and
energizing the first coil set and the second coil set to move a rotor of the motor to a desirable start-up position wherein a magnetic flux generated by the rotor is positionally and directionally aligned with a magnetic flux generated by the first coil set, the second coil set, and the third coil set.

15. The method of claim 14 further comprising supplying a first current to said first coil set and said second coil set, and supplying a second current to said third coil set, wherein said second current is equal in magnitude and opposite in direction to said first current.

16. The method of claim 15 wherein said first current is substantially evenly split between each coil of said first coil set and said second coil set, and said second current is substantially evenly split between each coil of said third coil set such that a magnitude of current through each coil of said first coil set and said second coil set is different from a magnitude of current through each coil of said third coil set.

17. The method of claim 15 wherein said supplying said first current and said second current during a time interval moves the rotor of the motor from a first position, at which the rotor is not moving, to a second position.

18. The method of claim 14 wherein said first polarity corresponds to a positive polarity and said second polarity corresponds to a negative polarity.

19. The method claim 14 further comprising supplying a first current to said first coil set and said second coil set, and supplying a second current to said third coil set to form an unsymmetrical magnetic flux in a stator of the motor that exerts a torque on the rotor of the motor to move the rotor away from a non-desirable start-up position.

20. The method of claim 19 further comprising removing said first current from at least one of said first coil set and said second coil set to move said rotor into said desirable start-up position.

21. The method of claim 20 further comprising removing current to said first coil set, said second coil set, and said third coil set to stop said rotor in said desirable start-up position.

22. The method of claim 14 wherein said desirable start-up position comprises a 30 degree position of said rotor.

* * * * *

UNITED STATES PATENT AND TRADEMARK OFFICE
CERTIFICATE OF CORRECTION

| | | |
|---|---|---|
| PATENT NO. | : 7,358,692 B2 | Page 1 of 1 |
| APPLICATION NO. | : 11/146555 | |
| DATED | : April 15, 2008 | |
| INVENTOR(S) | : Dongho Lee | |

It is certified that error appears in the above-identified patent and that said Letters Patent is hereby corrected as shown below:

In column 6, line 38, in Claim 1, delete "sources," and insert -- source, --, therefor.

In column 6, line 41, in Claim 1, delete "start up" and insert -- start-up --, therefor.

In column 6, line 47, in Claim 3, delete "start-un" and insert -- start-up --, therefor.

In column 8, line 20, in Claim 19, after "method" insert -- of --.

Signed and Sealed this

Fifth Day of August, 2008

JON W. DUDAS
*Director of the United States Patent and Trademark Office*